United States Patent
Cui et al.

(10) Patent No.: US 11,683,054 B2
(45) Date of Patent: Jun. 20, 2023

(54) MULTI-BAND RADIO FREQUENCY FRONT-END DEVICE, MULTI-BAND RECEIVER, AND MULTI-BAND TRANSMITTER

(71) Applicant: Huawei Technologies Co., Ltd., Shenzhen (CN)

(72) Inventors: Keji Cui, Shanghai (CN); Di Li, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/360,247

(22) Filed: Jun. 28, 2021

(65) Prior Publication Data
US 2021/0328606 A1 Oct. 21, 2021

Related U.S. Application Data

(63) Continuation of application No. PCT/CN2018/125837, filed on Dec. 29, 2018.

(51) Int. Cl.
*H04B 1/04* (2006.01)
*H04B 1/00* (2006.01)
*H04B 1/30* (2006.01)

(52) U.S. Cl.
CPC ......... *H04B 1/0458* (2013.01); *H04B 1/0057* (2013.01); *H04B 2001/0416* (2013.01); *H04B 2001/307* (2013.01)

(58) Field of Classification Search
CPC .......... H04B 1/02; H04B 1/04; H04B 1/0458; H04B 1/0057; H04B 1/06; H04B 1/16;
(Continued)

(56) References Cited

U.S. PATENT DOCUMENTS 5,774,017 A    6/1998  Adar
7,349,717 B2 *  3/2008  Block ..................... H04B 1/48
                                            455/552.1
(Continued)

FOREIGN PATENT DOCUMENTS

CN     200990608 Y    12/2007
CN     103338054 A    10/2013
(Continued)

OTHER PUBLICATIONS

Ikuo Takakuwa, Antenna Module, Mar. 21, 2019, WO-2019054094-A1, English Text. (Year: 2019).*
(Continued)

*Primary Examiner* — Quochien B Vuong
(74) *Attorney, Agent, or Firm* — Slater Matsil, LLP

(57) ABSTRACT

A multi-band radio frequency front-end device, a multi-band receiver, and a multi-band transmitter, the multi-band radio frequency front-end device including a first radio frequency front-end circuit, where the first radio frequency front-end circuit works on a first band, a second radio frequency front-end circuit, where the second radio frequency front-end circuit works on a second band, a first input/output matching network, and a second input/output matching network, where routing of the first input/output matching network and routing of the second input/output matching network on a layout are annular and nested.

18 Claims, 11 Drawing Sheets

(58) Field of Classification Search
CPC . H04B 1/18; H04B 1/40; H04B 1/401; H04B 1/406; H04B 1/581; H01Q 5/30; H01Q 5/335

See application file for complete search history.

(56) References Cited

U.S. PATENT DOCUMENTS

| | | | |
|---|---|---|---|
| 9,837,726 B2 * | 12/2017 | Sharawi | H01Q 23/00 |
| 9,973,232 B1 | 5/2018 | Kuo et al. | |
| 9,979,375 B2 | 5/2018 | Leuschner et al. | |
| 10,020,793 B2 | 7/2018 | Klemens | |
| 10,382,084 B1 * | 8/2019 | Huang | H04B 1/18 |
| 10,771,102 B2 * | 9/2020 | Yokoyama | H04B 1/0458 |
| 11,322,844 B2 * | 5/2022 | Nikolayenkov | H04B 1/18 |
| 2006/0017386 A1 | 1/2006 | Sorensen et al. | |
| 2012/0295553 A1 | 11/2012 | Sahota | |
| 2013/0215378 A1 | 8/2013 | Pugh et al. | |
| 2015/0349726 A1 | 12/2015 | Han et al. | |
| 2016/0072456 A1 | 3/2016 | Lin et al. | |
| 2017/0324381 A1 | 11/2017 | Qian et al. | |
| 2017/0345559 A1 | 11/2017 | Vanukuru | |
| 2018/0145404 A1 | 5/2018 | Lavedas | |

FOREIGN PATENT DOCUMENTS

| | | |
|---|---|---|
| CN | 104300001 A | 1/2015 |
| CN | 106208989 A | 12/2016 |
| CN | 106532262 A | 3/2017 |
| CN | 107004492 A | 8/2017 |
| CN | 108292928 A | 7/2018 |
| CN | 109004373 A | 12/2018 |
| TW | 201640819 A | 11/2016 |
| WO | 2016155791 A1 | 10/2016 |
| WO | WO-2019054094 A1 * | 3/2019 |

OTHER PUBLICATIONS

"3rd Generation Partnership Project; Technical Specification Group Radio Access Network; Study on new radio access technology: Radio Frequency (RF) and co-existence aspects (Release 14)," 3GPP TR 38.803 V14.2.0, Sep. 2017, 205 pages.

Wongsin, N. et al., "High Gain Multiband Circular Loop Antenna with Ring Resonators Reflectors by using FSS Technique," The 2015 International Workshop on Antenna Technology, 2015, 4 pages.

Yanna, C., "Research and Design of CMOS Multi-band RF Power Amplifier," Beijing Jiaotong University, 2008, 2 pages (Abstract Only).

* cited by examiner

MULTI-BAND RADIO FREQUENCY FRONT-END DEVICE, MULTI-BAND RECEIVER, AND MULTI-BAND TRANSMITTER

CROSS-REFERENCE TO RELATED APPLICATIONS

This application is a continuation of International Application No. PCT/CN2018/125837, filed on Dec. 29, 2018, the disclosure of which is hereby incorporated by reference in its entirety.

TECHNICAL FIELD

This application relates to the field of communications technologies, and in particular, to a multi-band radio frequency front-end device, a multi-band receiver, and a multi-band transmitter.

BACKGROUND

5th generation (5G) mobile communication is a next generation wireless system and network architecture, and may provide a faster data rate, a lower-latency connection, and a higher bandwidth on a millimeter-wave (mm Wave) band, to support many high-data-rate applications, for example, a 5G mobile phone, a wireless infrastructure, the wireless gigabit alliance (WiGig), an advanced driver assistance system (ADAS), a small cell, and broadband satellite communication. With the advent of the 5G era, application of a phased array technology supporting multiple-input multiple-output (MIMO) in a 5G system has been developed unprecedentedly, and a multi-channel transceiver having a beamforming function is widely studied and applied.

Currently, 3GPP (the 3rd generation partnership project) divides a 5G communication band into two parts: sub-6 GHz and a 5G high frequency. Bands n257, n258, n260, and n261 are 5G high frequency millimeter-wave bands, n257, n258, and n261 are concentrated around 28 GHz, and n260 is concentrated around 39 GHz. Generally, when a 5G high frequency band is put into commercial use, different countries or operators support different bands. For example, in a country A, an operator a supports the band n257 and an operator b supports the band n258, and an operator c in a country B supports the band n260. For a 5G communications device (for example, a smart terminal or a tablet computer), if a phased array system needs to be used, to support bands operated by different operators, a high frequency circuit in the phased array system needs to be compatible with both of two millimeter-wave bands of 28 GHz and 39 GHz, to meet requirements of a communications device for low power consumption, a small area, and low costs.

Generally, on the high frequency circuit, power matching needs to be performed on ports by using matching networks (including an output matching network and an input matching network), to meet a power transmission condition. A transformer is an important passive device of the matching network. To implement compatibility with the two millimeter-wave bands of 28 GHz and 39 GHz, a ratio of a quantity of coil turns of a primary coil to a quantity of coil turns of a secondary coil of the transformer and resonant capacitors connected in parallel to the primary coil and the secondary coil of the transformer may be adjusted to obtain an appropriate impedance transformation ratio, to implement power matching.

A conventional manner of implementing a high frequency matching network compatible with a plurality of bands includes the following.

In a first manner, as shown in FIG. 1, impedance matching (namely, an input matching network and an output matching network) of an input port and an output port of an element of a high frequency circuit is respectively implemented by using a transformer with a fixed parameter and a resonant capacitor with a fixed parameter. Broadband power matching may be implemented in the bands of 28 GHz to 39 GHz by adjusting a coupling coefficient of the transformer. A primary element of the high frequency circuit is a cascode amplifier. In other words, a broadband matching network is implemented by using a transformer.

However, the structure has the following two defects, including the following.

A: The broadband matching network introduces a relatively high insertion loss. Therefore, extra power consumption is needed to compensate for the insertion loss introduced by the matching network, and as a result, power consumption of the entire high frequency circuit increases. Especially on a high frequency circuit requiring very high efficiency, for example, a PA, using an ultra-broadband matching network greatly reduces a performance indicator of a module.

B: The broadband matching network is very sensitive to a port impedance. If the port impedance is high, the broadband matching network generally needs to be implemented by using a very large transformer, and gain flatness on the band is poor. This increases a chip area and affects performance of the high frequency circuit.

In a second manner, as shown in FIG. 2a and FIG. 2b, an example in which an element of a high frequency circuit element is a cascode amplifier is still used. On the high frequency circuit, band switching is implemented by changing a parameter of a matching network, to implement compatibility with a plurality of bands. FIG. 2a shows that band switching is implemented by changing capacitance values of resonant capacitors respectively connected in parallel to a primary coil and a secondary coil of a transformer, and FIG. 2b shows that band switching is implemented by changing inductance values of a primary coil and a secondary coil of a transformer.

The circuit structure has the following disadvantage. A switch is needed to switch an inductance value or a capacitance value of a matching network. However, on a millimeter-wave band, a CMOS (complementary metal-oxide-semiconductor) process cannot provide a switch with good performance. Especially in a process of switching the inductance value or the capacitance value of the matching network, a millimeter-wave switch introduces a relatively high loss, and as a result, a quality factor of a passive device of the matching network decreases. The decrease in the quality factor causes a decrease in an amplifier gain and deterioration in noise performance.

In view of accelerated commercialization of 5G, a design solution that can be compatible with a plurality of bands and that has low power consumption, a small area, and low costs is urgently required to meet a requirement of 5G millimeter-wave communication.

SUMMARY

Embodiments of this application disclose a multi-band radio frequency front-end device, a multi-band receiver, and a multi-band transmitter that have a low insertion loss and a small chip area, to meet a requirement of 5G millimeter-wave communication.

According to a first aspect, an embodiment of this application provides a multi-band radio frequency front-end device, including a first radio frequency front-end circuit, where the first radio frequency front-end circuit works on a first band, a second radio frequency front-end circuit, where the second radio frequency front-end circuit works on a second band, and a frequency of the first band is higher than a frequency of the second band, a first matching network, coupled to the first radio frequency front-end circuit, and a second matching network, coupled to the second radio frequency front-end circuit, where routing of the first matching network and routing of the second matching network on a layout are annular and nested.

In a possible implementation, the first matching network includes a first output matching network, coupled to an output end of the first radio frequency front-end circuit, the second matching network includes a second output matching network, coupled to an output end of the second radio frequency front-end circuit, and routing of the first output matching network and routing of the second output matching network on the layout are annular and nested.

In a possible implementation, the first matching network includes a first input matching network, coupled to an input end of the first radio frequency front-end circuit, the second matching network includes a second input matching network, coupled to an input end of the second radio frequency front-end circuit, and routing of the first input matching network and routing of the second input matching network on the layout are annular and nested.

In this application, after a first output network and a second output network are nested on the layout, an occupied layout area is equivalent to a layout area occupied by a conventional single matching network. Therefore, a chip area can be reduced, thereby reducing costs. In addition, because no extra power consumption needs to be introduced for compensation as in the solution in the prior art 1, power consumption can be reduced.

In a possible implementation, the first output matching network, the first input matching network, the second output matching network, and the second input matching network each are a matching network with a fixed parameter.

In the foregoing implementation, parameters of the first output matching network and the first input matching network are set based on the first band, and parameters of the second output matching network and the second input matching network are set based on the second band.

The input/output matching networks with the fixed parameters are used, so that an adverse impact caused on a quality factor, a gain, and noise during band switching of an existing tunable matching network can be avoided.

In a possible implementation, the first radio frequency front-end circuit and the second radio frequency front-end circuit each may include any one of a power amplifier, a low noise amplifier, a variable gain amplifier, a filter, a phase shifter, or a frequency mixer.

In a possible implementation, the first output matching network and the second output matching network each include one of a transformer, an inductor, or a balun.

In a possible implementation, the first output matching network includes a first primary coil and a first secondary coil, the second output matching network includes a second primary coil and a second secondary coil, the first primary coil is embedded in the second primary coil, and the first secondary coil is embedded in the second secondary coil.

With reference to the preceding implementation, in another implementation, when a quantity of coil turns of each of the first primary coil, the second primary coil, the first secondary coil, and the second secondary coil is 1, the first primary coil and the second primary coil are embedded at a same layer, and the first secondary coil and the second secondary coil are embedded at another layer.

Optionally, in another implementation, when a quantity of coil turns of each of the first primary coil and the second primary coil is n, and n is an integer greater than 1, the first primary coil and the second primary coil are disposed at at least two layers, and at any layer, the first primary coil is embedded in the second primary coil.

Optionally, in another implementation, when a quantity of coil turns of each of the first secondary coil and the second secondary coil is n, and n is an integer greater than 1, the first secondary coil and the second secondary coil are disposed at at least two layers, and at any layer, the first secondary coil is embedded in the second secondary coil.

In a possible implementation, the first input matching network and the second input matching network each include one of a transformer, an inductor, or a balun.

In a possible implementation, an output manner used by the first output matching network and the second output matching network after packaging includes a differential output manner or a single-ended output manner.

In a possible implementation, the first band covers a band n260, and the second band covers at least one band in n257, n258, or n261.

According to a second aspect, an embodiment of this application provides a multi-band receiver, applied to millimeter-wave communication, and including a first receive channel, configured to process a signal on a band n260, and a second receive channel, configured to process a signal on at least one band in n257, n258, or n261, where the second receive channel includes a second matching network, the first matching network supports the band n260, the first receive channel includes a first matching network, and the second matching network supports a band in n257, n258, and n261.

In a possible implementation, routing of the first matching network and routing of the second matching network on a layout are annular and nested.

In this application, because the first matching network and the second matching network are designed in a nested manner, the multi-band radio frequency receiver has advantages such as a low insertion loss, a small chip area, and low power consumption when implementing compatibility with 28 GHz/39 GHz millimeter-wave communication, to meet requirements of a communications device for low power consumption, a small area, and low costs.

In a possible implementation, the multi-band receiver is a phased array receiver.

According to a third aspect, an embodiment of this application provides a multi-band transmitter, applied to millimeter-wave communication, and including a first transmit channel, configured to process a signal on a band n260, and a second transmit channel, configured to process a signal on at least one band in n257, n258, or n261, where the second transmit channel includes a second matching network, the first matching network supports the band n260, the first transmit channel includes a first matching network, and the second matching network supports a band in n257, n258, and n261.

In a possible implementation, routing of the first matching network and routing of the second matching network on a layout are annular and nested.

In this application, because the first matching network and the second matching network are designed in a nested manner, the multi-band radio frequency transmitter has advantages such as a low insertion loss, a small chip area, and low power consumption when implementing compatibility with 28 GHz/39 GHz millimeter-wave communication, to meet requirements of a communications device for low power consumption, a small area, and low costs.

In a possible implementation, the multi-band transmitter is a phased array transmitter.

BRIEF DESCRIPTION OF THE DRAWINGS

FIG. 5 is a schematic packaging structural diagram of the multi-band radio frequency front-end device shown in FIG. 3a;

FIG. 6b is a schematic packaging structural diagram of a radio frequency front-end device in the transceiver shown in FIG. 6a.

DETAILED DESCRIPTION OF ILLUSTRATIVE EMBODIMENTS

The following describes the embodiments of this application in detail with reference to the accompanying drawings in the embodiments of this application.

In the specification, claims, and accompanying drawings of this application, the terms such as "first" and "second" are intended to distinguish between different objects but do not indicate a particular order. In addition, the terms "including", "having", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be further understood that in this application, "at least one" means one or more, "a plurality of" means two or more, and "at least two" means two, three, or more. The term "and/or" is used to describe an association relationship between associated objects and represents that three relationships may exist. For example, "A and/or B" may represent the following three cases: Only A exists, only B exists, and both A and B exist, where each of A and B may be in a singular form or a plural form. The character "/" usually indicates an "or" relationship between associated objects. "At least one of the following" or a similar expression means any combination of these items, including a single item or any combination of a plurality of items. For example, at least one of a, b, or c may represent a, b, c, a and b, a and c, b and c, or a, b, and c, where a, b, and c may be singular or plural.

Figure 3A:
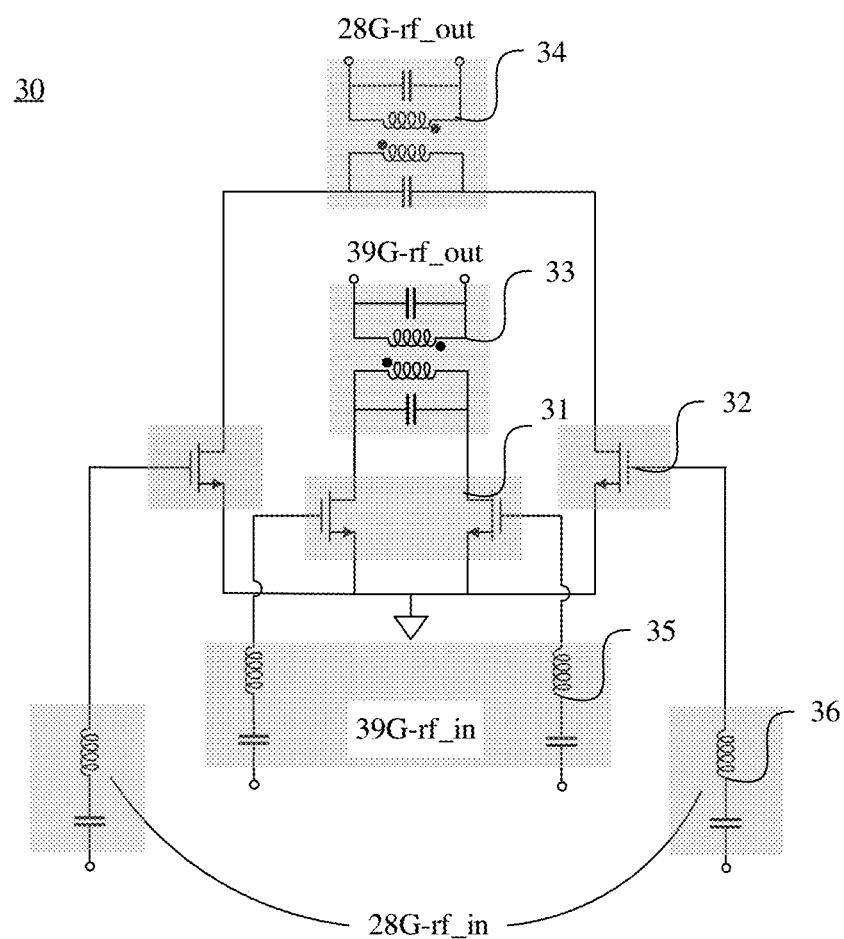
FIG. 3a to FIG. 3d are schematic structural diagrams of a multi-band radio frequency front-end device according to an embodiment of this application.

FIG. 3a is a schematic circuit structural diagram of a multi-band radio frequency front-end device 30 according to an embodiment of this application. In FIG. 3a, the radio frequency front-end device 30 includes a first radio frequency front-end circuit 31 and a second radio frequency front-end circuit 32, where the first radio frequency front-end circuit 31 works on a first band, the second radio frequency front-end circuit 32 works on a second band, both the first band and the second band are millimeter-wave bands, and a frequency of the first band is higher than a frequency of the second band, a first output matching network 33, coupled to an output end of the first radio frequency front-end circuit 31, and configured to implement output power matching, a second output matching network 34, coupled to an output end of the second radio frequency front-end circuit 32, and configured to implement output power matching, a first input matching network 35, coupled to an input end of the first radio frequency front-end circuit 31, and configured to implement input power matching, and a second input matching network 36, coupled to an input end of the second radio frequency front-end circuit 32, and configured to implement input power matching.

A person skilled in the art should learn that in a mobile communications system, a radio frequency front-end circuit, as an important composition part of a transceiver (transceiver), is mainly configured to completely extract, without distortion, a wanted radio frequency signal in a spatial signal received by an antenna and transmit the signal to a downstream down-conversion circuit, or perform power amplification on a signal converted by an up-conversion circuit and then send an amplified signal by using an antenna. Herein, either of the first radio frequency front-end circuit 31 and the second radio frequency front-end circuit 32 may mainly include power amplifier devices such as a power amplifier (PA), a low noise amplifier (LNA), and a variable gain amplifier (VGA), and may further include devices such as a filter, a phase shifter, and a frequency mixer. For details, refer to the prior art, and details are not described herein again.

Figure 2A:
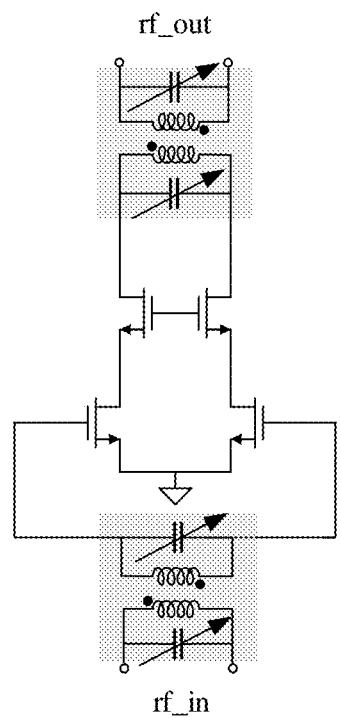
FIGS. 2a and 2b are schematic diagrams of an existing tunable matching network.
Figure 2B:
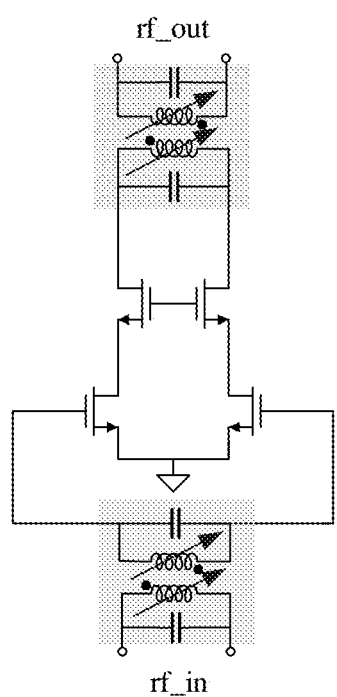

In this embodiment, parameters of the first output matching network 33 and the first input matching network 35 are set based on the first band, the second output matching network 34 and the second input matching network 36 are set based on the second band, and both the first band and the second band are millimeter-wave bands. Using a matching network with a fixed parameter can avoid problems of the prior art shown in FIG. 2a and FIG. 2b such as a decrease in a quality factor, a decrease in a gain, and deterioration in noise caused because band switching is performed by using a millimeter-wave switch.

Specifically, the first output matching network 33 and the first input matching network 35 may be set based on a frequency range of the first band.

Figure 3B:
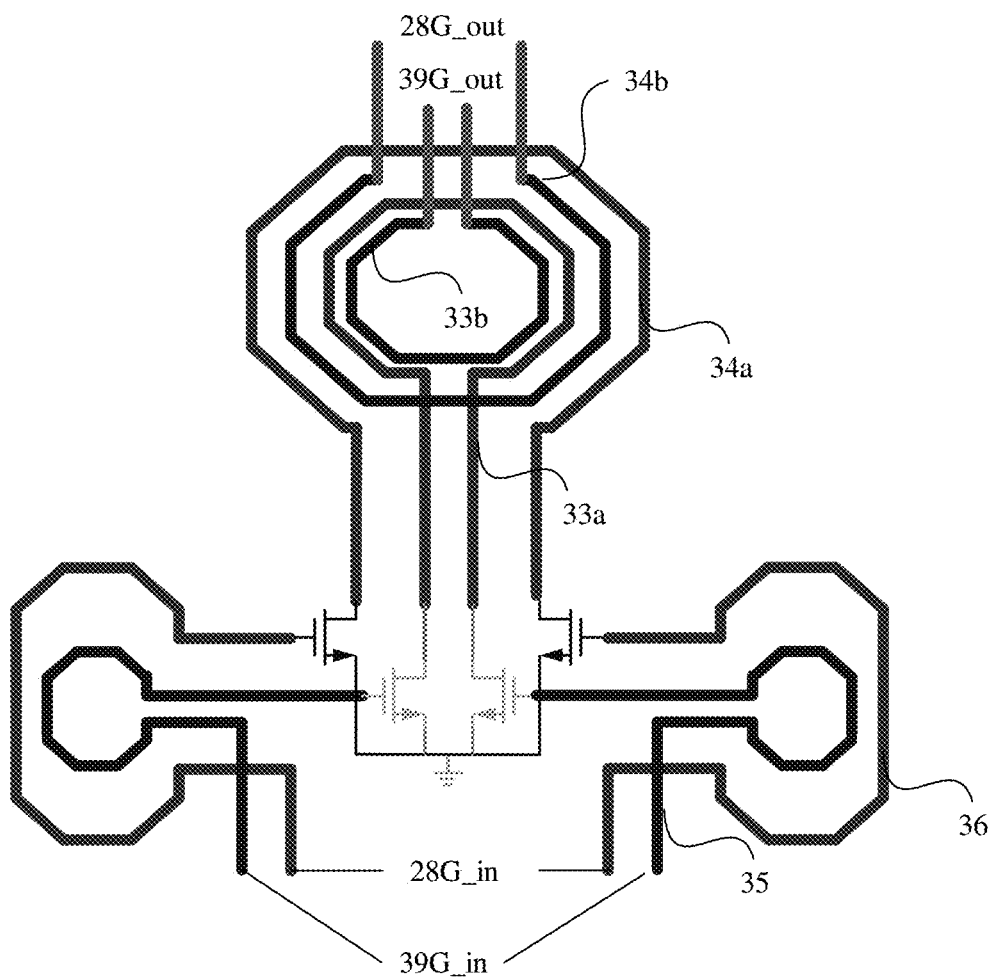

FIG. 3b is a schematic diagram of a layout design of the radio frequency front-end device 30 shown in FIG. 3a. It should be noted that because both the first radio frequency front-end circuit 31 and the second radio frequency front-end circuit 32 use a conventional layout design, and complexity degrees of layout designs are different for different radio frequency front-end circuits, FIG. 3b shows respective layouts of the first output matching network 33, the second output matching network 34, the first input matching network 35, and the second input matching network 36, and the first radio frequency front-end circuit 31 and the second radio frequency front-end circuit 32 are represented by using symbols of circuit elements.

In a possible implementation, referring to FIG. 3b, the first output matching network 33 and the second output matching network 34 each are a transformer, the first output matching network 33 includes a first primary coil 33a and a first secondary coil 33b, and similarly, the second output matching network 34 includes a second primary coil 34a and a second secondary coil 34b.

Further, as shown in FIG. 3b, the first input matching network 35 and the second input matching network 36 each are an inductor.

It should be noted that in this embodiment, the first input matching network 35 and the second input matching network 36 may be inductors. Similarly, the first input matching network 35 and the second input matching network 36 may be alternatively transformers. Therefore, in this embodiment, an output matching network and an input matching network each may be any element that can implement impedance matching, and includes but is not limited to a transformer, an inductor, a balun, or a transformer with a tuning capacitor. Layout designs of the output matching networks and the input matching networks may be mutually referenced.

In this embodiment, routing of the first output matching network 33 and routing of the second output matching network 34 on a layout are annular and nested, and routing of the first input matching network 35 and routing of the second input matching network 36 on a layout are also annular and nested. It should be understood that the ring shape described in this specification may be a regular ring, or a shape such as a hexagon or an octagon. Because two matching networks correspond to different operating bands, and inductances needed for implementing impedance matching are different, lengths (or referred to as sizes) of routing of the matching networks on a layout are different. When the routing is bent to form a loop, longer routing may surround shorter routing, so that a part without routing on a layout area enclosed by the longer routing can be provided for the shorter routing, thereby improving utilization of the layout area, and helping reduce a chip area. For sizes of the routing of the two input/output matching networks, details are provided below.

Specifically, when the first output matching network 33 and the second output matching network 34 perform impedance matching by using transformers, referring to FIG. 3b, on the layout, the first primary coil 33a is embedded in the second primary coil 34a, and the first secondary coil 33b is also embedded in the second secondary coil 34b.

For example, as shown in FIG. 3a and FIG. 3b, in this embodiment, the first band is marked as a 39 GHz band, and the second band is marked as a 28 GHz band. A person skilled in the art should learn that a 5G millimeter-wave band includes n257 (26500 MHz to 29500 MHz), n258 (24250 MHz to 27500 MHz), n260 (37000 MHz to 40000 MHz), and n261 (27500 MHz to 28350 MHz). Frequency ranges of n257 and n261 are concentrated around a 28 GHz frequency, and n257 and n261 each are generally referred to as a 28 GHz band. A frequency range of n260 is concentrated around 39 GHz, and n260 is generally referred to as a 39 GHz band. A frequency of n258 is concentrated around 26 GHz, and n258 generally is referred to as a 26 GHz band. Because the 26 GHz band is close to the 28 GHz band, the second band with a center frequency of 28 GHz is used, and a frequency range of the second band is (24250 MHz to 29500 MHz), that is, all of n257, n258, and n261 can be covered. In addition, the first band with a center frequency of 39 GHz is used, to cover n260. It should be noted that the two center frequencies 28 GHz and 39 GHz mentioned herein are merely an example. During specific implementation, the center frequencies of the first band and the second band may be other values, for example, 38 GHz and 27 GHz, provided that the first band can cover n260, and the second band can cover n257, n258, and n261. This is not specifically limited in this application. In addition, although only the foregoing several NR bands are currently formulated in the 5G millimeter-wave band, it should be understood that the technical solutions provided in this application are also applicable to another band in the millimeter-wave band and another high frequency band.

In this embodiment, it should be noted that when the radio frequency front-end device 30 works, if a signal on the band n260 is currently processed, from the perspective of a 39 GHz input port, an input/output matching network corresponding to the 28 GHz band is in a high impedance state. Therefore, no interference is caused to the 39 GHz band, and vice versa.

Further, the first radio frequency front-end circuit 31 and the second radio frequency front-end circuit 32 each have an independently controlled active bias circuit. When the first radio frequency front-end circuit 31 processes a signal on n260, the active bias circuit corresponding to the second radio frequency front-end circuit 32 may be disabled. Similarly, when the second radio frequency front-end circuit 32 processes a signal on n257, n258, or n261, the active bias circuit corresponding to the first radio frequency front-end circuit 31 may be disabled.

In this embodiment, because the first radio frequency front-end circuit 31 works on the first band with the center frequency of 39 GHz, when impedance matching is implemented separately on the input end and the output end of the first radio frequency front-end circuit 31, a needed inductance value is less than an inductance needed for impedance matching of the second radio frequency front-end circuit 32. Therefore, a size of the first primary coil 33a in the first output matching network 33 is smaller than a size of the second primary coil 34a in the second output matching network 34. Therefore, in a layout design, the first primary coil 33a is embedded in the second primary coil 34a, and the second primary coil 34a surrounds the first primary coil 33a. Similarly, the first secondary coil 33b is also embedded in the second secondary coil 34b. For the first input matching network 35 and the second input matching network 36, during implementation of impedance matching, a size of an inductor used in the first input matching network 35 is less than a size of an inductor used in the second input matching network 36. Therefore, the inductor of the first input matching network 35 is embedded in the inductor of the second input matching network 36.

Figure 3C:
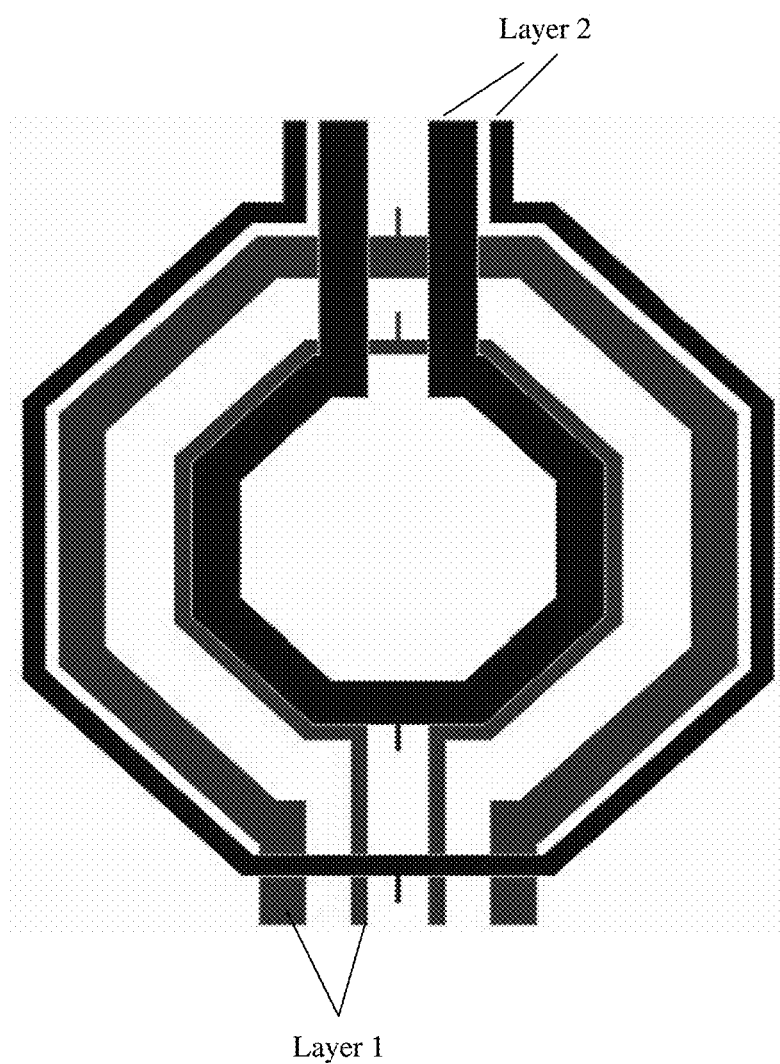

Further, for high frequency millimeter-wave bands such as 28 GHz and 39 GHz, during implementation of impedance matching, an inductance value needed by each of the output matching network and the input matching network is relatively small, and a one-turn coil may be used as a primary coil or a secondary coil. Therefore, the inductor, the primary coil, and the secondary coil each can be implemented through single-layer routing. Referring to FIG. 3c, the first primary coil 33a and the second primary coil 34a are disposed on a same layer (layer 1). To avoid crossing of routing of a secondary coil and routing of a primary coil, the first secondary coil 33b and the second secondary coil 34b need to be disposed on another layer (layer 2). A person skilled in the art should learn that if a quantity of coil turns of the primary coil or the secondary coil is n, where n is an integer greater than 1, during layout designing, the primary coils and the secondary coils need to be disposed at at least two layers. At any layer, a smaller coil needs to be embedded in a larger coil.

Figure 1:
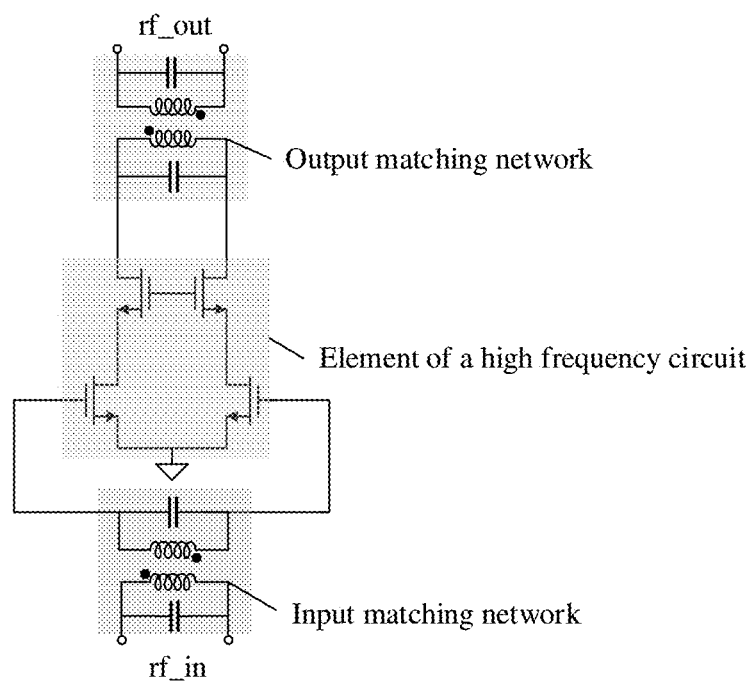
FIG. 1 is a schematic diagram of an existing broadband matching network.
Figure 3D:
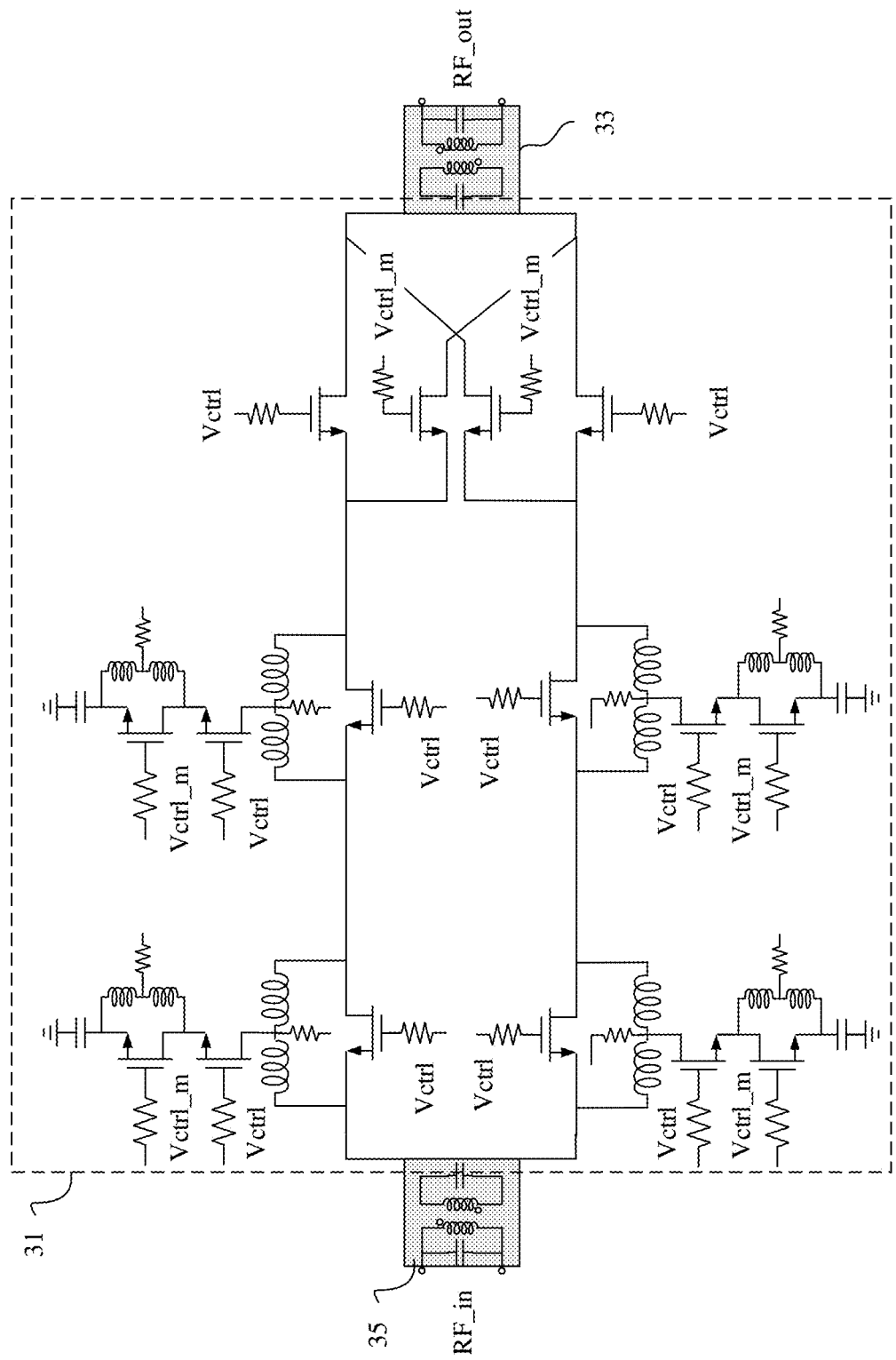

In this embodiment, the first radio frequency front-end circuit 31 shown in FIG. 3*a* is an amplification circuit including a transistor. Further, as shown in FIG. 3*d*, the first radio frequency front-end circuit 31 may be alternatively a phase shifter including a plurality of transistors. In addition, the first radio frequency circuit 31 may be alternatively a cascode circuit shown in FIG. 1. In other words, in this embodiment, for a specific circuit structure of the first radio frequency front-end circuit 31, refer to circuit structures of radio frequency front-end devices such as a power amplifier (PA), a low noise amplifier (LNA), a filter, a phase shifter, a duplexer, and a variable gain amplifier (VGA) provided in the prior art. This is not specifically limited herein. Because the second radio frequency front-end circuit 32 and the first radio frequency front-end circuit 31 are circuits of a same type, for example, are LNAs or PAs, a circuit structure of the second radio frequency front-end circuit 32 is similar to the circuit structure of the first radio frequency front-end circuit 31, and details are not described again.

Figure 4A:
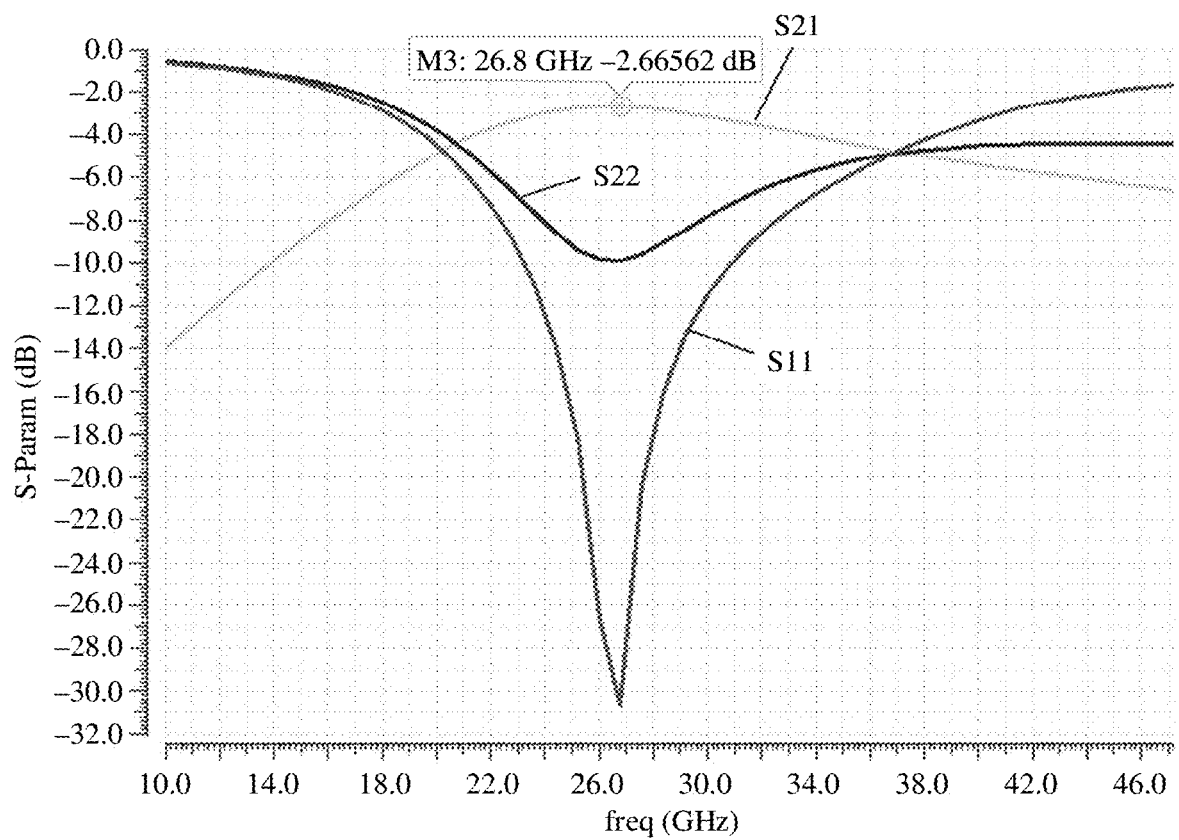
FIG. 4a is a schematic diagram of simulation when the multi-band radio frequency front-end device shown in FIG. 3a works on a 28 GHz band.
Figure 4B:
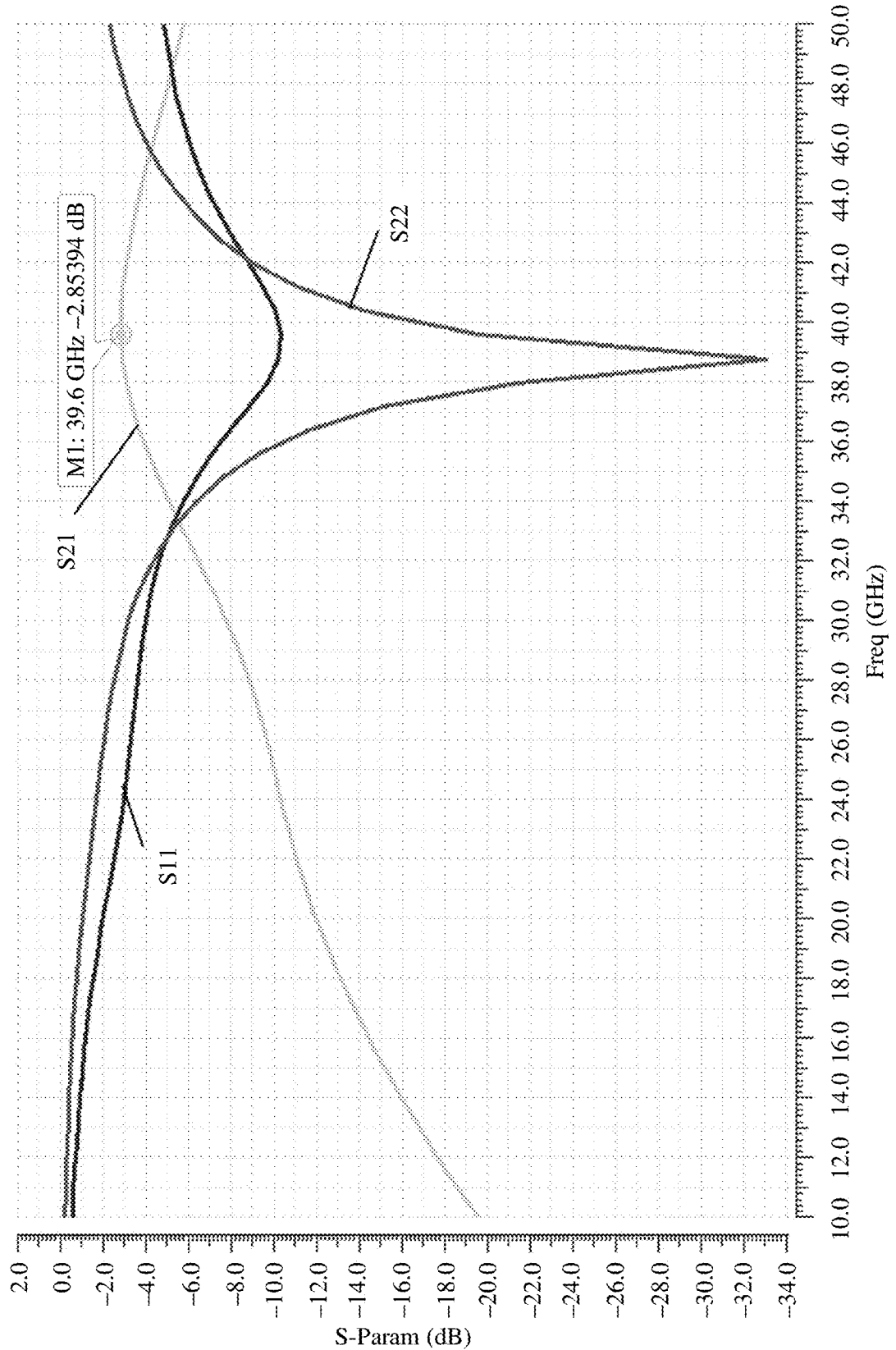
FIG. 4b is a schematic diagram of simulation when the multi-band radio frequency front-end device shown in FIG. 3a works on a 39 GHz band.

FIG. 4*a* and FIG. 4*b* are schematic diagrams of simulation results of the multi-band radio frequency front-end device 30 provided in this application. As shown in FIG. 4*a*, when the multi-band radio frequency front-end device 30 works on the first band, that is, when the first radio frequency front-end circuit 31 in the multi-band radio frequency front-end device 30 works, a transmission coefficient S21 of the multi-band radio frequency front-end device 30 is the largest at a 26.8 GHz frequency, and at the same time, reflection coefficients S11 and S22 are the smallest. A person skilled in the art should learn that for a radio frequency front-end device, a larger transmission coefficient S21 indicates smaller reflection coefficients S11 and S22, and this means that higher transmission efficiency of the radio frequency front-end device indicates a lower insertion loss. Further, as shown in FIG. 4*b*, when the multi-band radio frequency front-end device 30 works on the second band, that is, when the second radio frequency front-end circuit 32 in the multi-band radio frequency front-end device 30 works, a transmission coefficient S21 of the multi-band radio frequency front-end device 30 is the largest at a 39.6 GHz frequency, and at the same time, reflection coefficients S11 and S22 are the smallest, and an insertion loss is also relatively low. It can be learned that according to the technical solutions provided in this application, compared with the prior art shown in FIG. 1, FIG. 2*a*, and FIG. 2*b*, the radio frequency front-end device can implement a low insertion loss when supporting a plurality of bands. In addition, because the multi-band radio frequency front-end device is disposed in a nested manner during layout designing, and this is equivalent to that a function of the multi-band radio frequency device is implemented with a chip area of a conventional single-band radio frequency device, the chip area can be reduced, to meet requirements of the communications device for low power consumption, a small area, and low costs.

Figure 5:
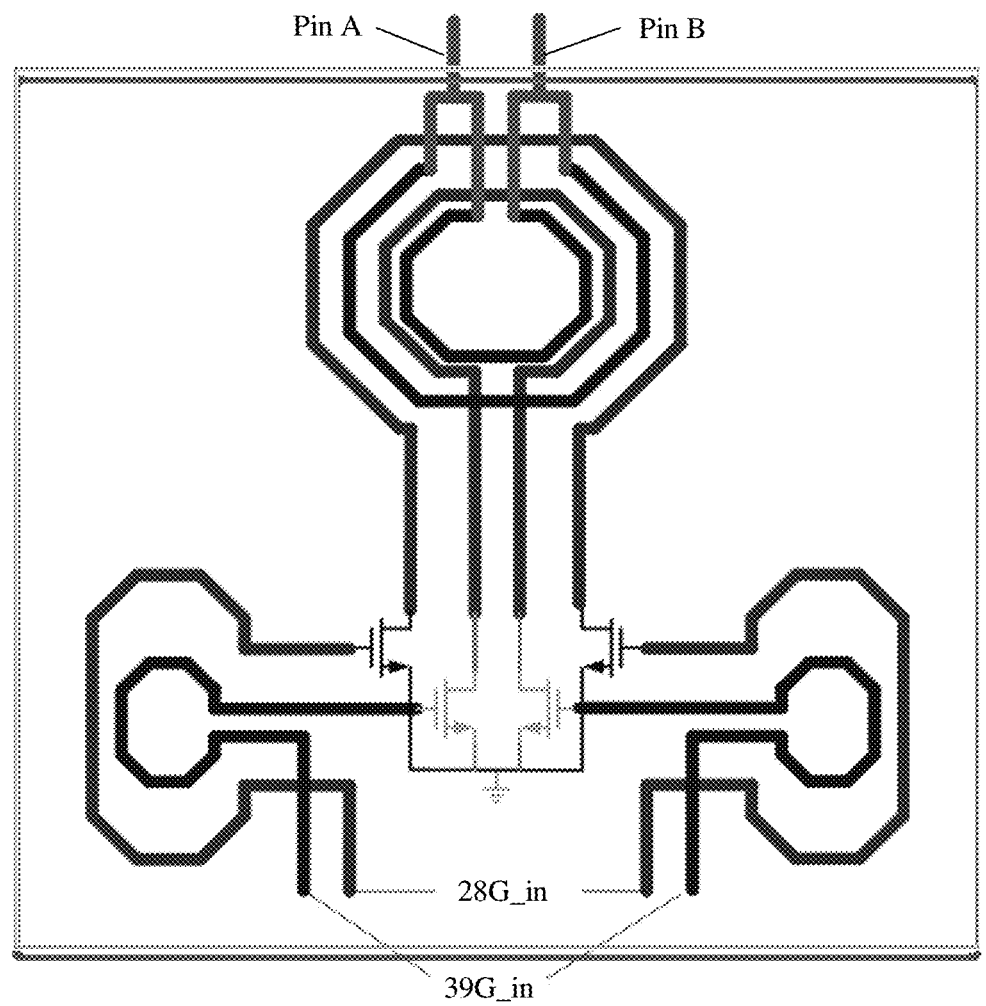

Further, as shown in FIG. 5, during packaging of the multi-band radio frequency front-end device 30, the multi-band radio frequency front-end device 30 may be packaged in a same packaging structure (a shadow part in the figure). Compared with a single-band radio frequency front-end device, the multi-band radio frequency front-end device 30 can support more bands without increasing a chip area. Therefore, application of the 5G millimeter-wave band can be better supported.

Further, during packaging, one differential output end of each of the first output matching network 33 and the second output matching network 34 may be coupled to a first output pin (pin A), and the other differential output end of each of the first output matching network 33 and the second output matching network 34 is coupled to a second output pin (pin B), to obtain a differential output multi-band radio frequency front-end device 30.

It should be noted that if either of the first output pin (pin A) and the second output pin (pin B) is grounded, the multi-band radio frequency front-end device 30 may also be used as a single-ended output device.

Generally, another upstream radio frequency front-end device is packaged in the same packaging structure together with the multi-band radio frequency front-end device 30. Therefore, the first input matching network 35 and the second input matching network 36 receive, through on-chip routing, a radio frequency signal input by the upstream radio frequency front-end device. Therefore, the first input matching network 35 and the second input matching network 36 are not connected to pins. However, if a packaging structure includes only the multi-band radio frequency front-end device 30, for pin designs corresponding to the first input matching network 35 and the second input matching network 36, refer to pin designs of the first output matching network 33 and the second output matching network 34. Details are not described herein again.

An embodiment of this application further provides a multi-band transceiver applied to 5G millimeter-wave communication. The transceiver includes a plurality of channels, and each channel includes the multi-band radio frequency front-end device 30 described in the foregoing embodiment.

Figure 6A:
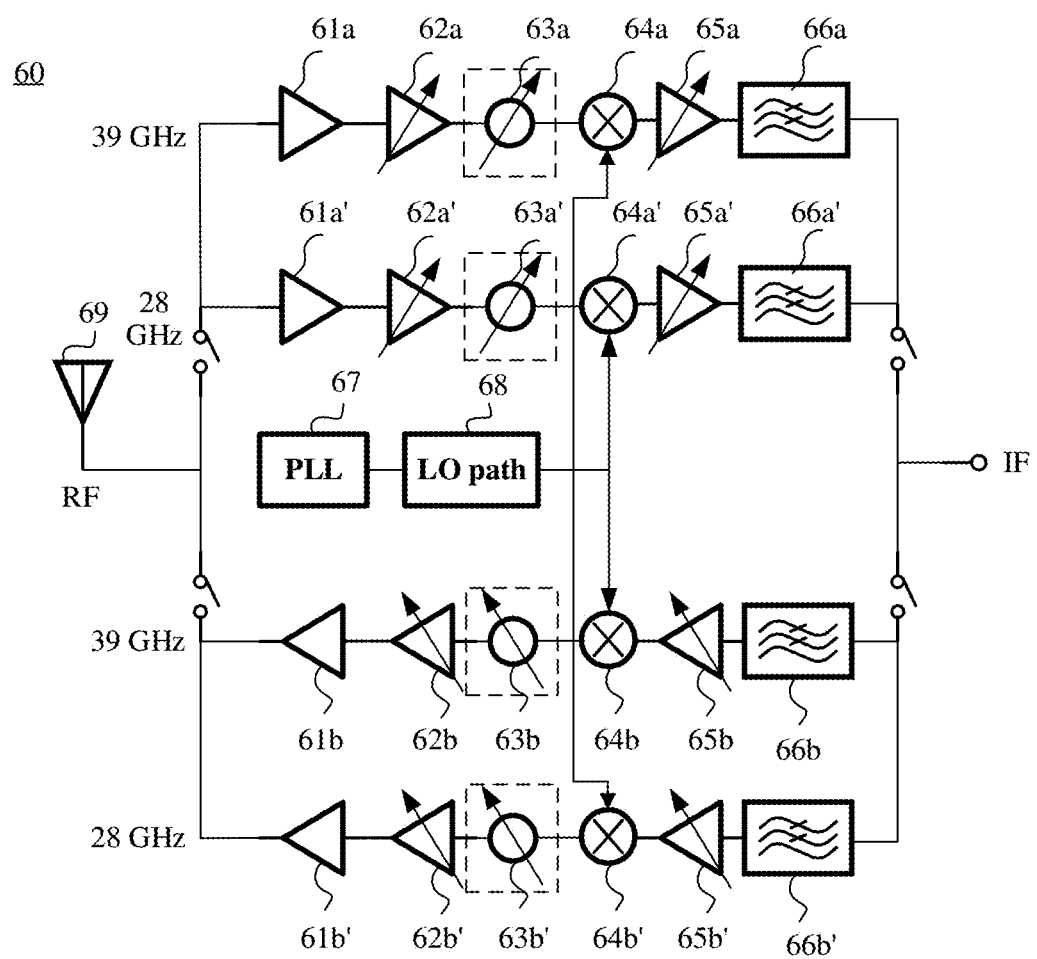
FIG. 6a is a schematic structural diagram of a multi-band radio frequency transceiver applied to 5G millimeter-wave communication according to an embodiment of this application.

Specifically, as shown in FIG. 6*a*, the transceiver may specifically include a first receive channel, including radio frequency front-end circuits such as a low noise amplifier LNA 61*a*, a radio frequency variable gain amplifier RFVGA 62*a*, a passive phase shifter (passive phase shifter, PPS) 63*a*, a frequency mixer 64*a*, an intermediate frequency variable gain amplifier IFVGA 65*a*, and an intermediate frequency filter 66*a*, where the first receive channel is configured to process a signal on a band n260, and the first receive channel includes a first matching network, and a second receive channel, including radio frequency front-end circuits such as a low noise amplifier LNA 61*a'*, an RFVGA 62*a'*, a PPS 63*a'*, a frequency mixer 64*a'*, an IFVGA 65*a'*, and an intermediate frequency filter 66*a'*, where the second receive channel is configured to process a signal on at least one band in a band n257, a band n258, or a band n261, and the second receive channel includes a second matching network, where the first matching network and the second matching network correspond to a radio frequency front-end circuit of a same type, for example, an input matching network of the LNA 61*a* is the first matching network, and correspondingly, an input matching network of the LNA 61*a'* is the second matching network.

Correspondingly, the first matching network supports the band n260, and the second matching network supports the band n257, the band n258, and the band n261.

It should be noted that the transceiver shown in FIG. 6*a* is also applicable to a zero-intermediate frequency architecture. In addition, because the PPS 63*a* and the PPS 63*a'* need to be used only in a phased array system, the PPS 63*a* and the PPS 63*a*' may be omitted for a receiver of another type, or an RFVGA and a frequency mixer are connected by using a bypass (bypass) circuit.

In this embodiment, any pair of radio frequency front-end circuits in the first receive channel and the second receive channel, for example, (the LNA 61*a* and the LNA 61*a*'), (the RFVGA 62*a* and the RFVGA 62*a*'), (the PPS 63*a* and the PPS 63*a*'), or (the frequency mixer 64*a* and the frequency mixer 64*a*'), are the two radio frequency front-end circuits in the multi-band radio frequency front-end device described in the foregoing embodiment. For example, the LNA 61*a*, the LNA 61*a*', and their respective matching networks as a whole are considered as the multi-band radio frequency front-end device described in the foregoing embodiment. Correspondingly, routing of the first matching network and routing of the second matching network (namely, their respective input/output matching networks) on a layout are nested. For a specific layout design, refer to the descriptions of the foregoing embodiment and FIG. 3*a* to FIG. 3*d*. Details are not described herein again.

When the transceiver shown in FIG. 6*a* uses the multi-band radio frequency front-end device 30 described in the foregoing embodiment, the transceiver may be compatible with 5G NR bands such as 26 GHz, 28 GHz, and 39 GHz, and has advantages of the multi-band radio frequency front-end device 30 such as a low insertion loss and a small chip area, to better meet a requirement of a communications device such as a 5G smartphone.

Further, in this embodiment, the LNA 61*a* in the first receive channel needs to be coupled to an antenna 69 by using a first input matching network, and the LNA 61*a*' in the second receive channel needs to be coupled to the antenna 69 by using a second input matching network. Routing of the first input matching network and routing of the second input matching network on a layout are nested. During packaging of their respective input networks, reference may be made to a design in FIG. 6*b*, that is, one differential input end of the first input matching network of the LNA 61*a* and one differential input end of the first input matching network of the LNA 61*a*' are coupled to one input pin (pin A), the other differential input end of the first input matching network of the LNA 61*a* and the other differential input end of the first input matching network of the LNA 61*a*' are coupled to the other input pin (pin B), and then the LNA 61*a* and the LNA 61*a*' are coupled to the antenna 69 by using the two pins, to receive a radio frequency signal input by using the antenna 69. It should be learned that using this layout design is equivalent to that a single-ended-to-differential function is implemented by using the respective input matching networks of the LNAs (61*a*, 61*a*').

Similarly, the input pin, namely, the pin A or the pin B, may be grounded, to enable the LNAs (61*a*, 61*a*') to be single-ended input devices.

Figure 6B:
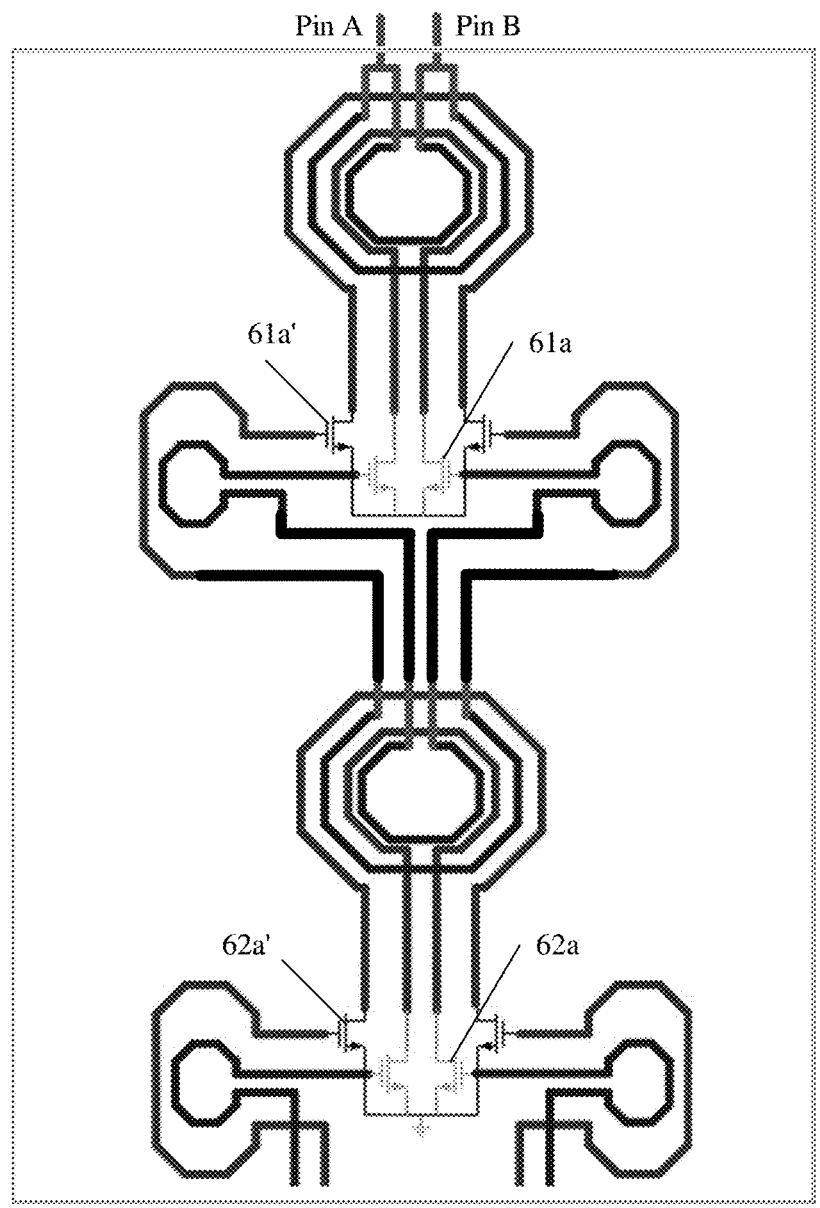

Further, as shown in FIG. 6*b*, when impedance matching is separately performed on the LNAs (61*a*, 61*a*') and the RFVGAs (62*a*, 62*a*'), because the LNAs (61*a*, 61*a*') and the RFVGAs (62*a*, 62*a*') may be in a same packaging structure (shown in a shadow part in the figure), the output matching networks of the LNAs (61*a*, 61*a*') are respectively connected to the input matching networks of the RFVGAs (62*a*, 62*a*') through on-chip routing.

Similarly, for connection between radio frequency front-end devices, for example, between the RFVGAs (62*a*, 62*a*') and the PPSs (63*a*, 63*a*'), and between the PPSs (63*a*, 63*a*'), and the frequency mixers (64*a*, 64*a*'), refer to the layout design that is of the LNAs (61*a*, 61*a*') and the RFVGAs (62*a*, 62*a*') during impedance matching.

Further, as shown in FIG. 6*a*, the transceiver further includes a first transmit channel, including a power amplifier PA 61*b*, a radio frequency variable gain amplifier RFVGA 62*b*, a passive phase shifter (passive phase shifter, PPS) 63*b*, a frequency mixer 64*b*, an intermediate frequency variable gain amplifier IFVGA 65*b*, and an intermediate frequency filter 66*b*, where the first transmit channel is configured to process a signal on the band n260, and a second transmit channel, including a power amplifier PA 61*b*', an RFVGA 62*b*', a PPS 63*b*', a frequency mixer 64*b*', an IFVGA 65*b*', and an intermediate frequency filter 66*b*', where the second transmit channel is configured to process a signal on at least one band in the band n257, the band n258, and the band n261.

The first transmit channel includes a first matching network, and the second transmit channel includes a second matching network.

The first matching network and the second matching network correspond to a radio frequency front-end circuit of a same type. For example, an output matching network of the PA 61*b* is the first matching network, and correspondingly, an output matching network of the PA 61*b*' is the second matching network.

Correspondingly, the first matching network supports the band n260, and the second matching network supports the band n257, the band n258, and the band n261.

Further, routing of the first matching network and routing of the second matching network on a layout are nested. For a specific layout design, refer to the descriptions of the foregoing embodiment and FIG. 3*a* to FIG. 3*d*. Details are not described herein again.

It should be learned that in the receive channel, an input signal of the antenna 69 is received by using the LNAs (61*a*, 61*a*'), and in the transmit channel, a radio frequency signal is sent to the antenna 69 by using the PAs (61*b*, 61*b*'), and radiated out by using the antenna 69. For a connection relationship between each of the respective output matching networks of the PAs (61*b*, 61*b*') and the antenna 69, refer to the connection relationship between each of the input matching networks of the LNAs (61*a*, 61*a*') and the antenna 69. Correspondingly, during packaging, for a manner of packaging of the respective output matching networks of the PAs (61*b*, 61*b*') and pins, refer to the layout design in FIG. 6*b*. Details are not described again.

It should be noted that for ease of description, the multi-band transceiver in FIG. 6*a* integrates a receiver and a transmitter. The receive channels and the transmit channels share the same antenna 69. The receiver and the transmitter may work in a time division manner. It should be learned that the receiver and the transmitter may be alternatively independent of each other.

It should be understood that specific embodiments described herein are merely common embodiments of the present invention, but are not intended to limit the present invention. Any modification, equivalent replacement, and improvement made without departing from the spirit and principle of the present invention shall fall within the protection scope of the present invention.

What is claimed is:

1. A multi-band radio frequency front-end device, comprising:
   a first radio frequency front-end circuit, configured to operate on a first band;
   a second radio frequency front-end circuit, configured to operate on a second band, wherein a frequency of the first band is higher than a frequency of the second band;

a first matching network, coupled to the first radio frequency front-end circuit; and
a second matching network, coupled to the second radio frequency front-end circuit, wherein routing of the first matching network and routing of the second matching network on a layout are annular and nested.

2. The multi-band radio frequency front-end device according to claim 1, wherein the first matching network comprises a first output matching network coupled to an output end of the first radio frequency front-end circuit;
wherein the second matching network comprises a second output matching network coupled to an output end of the second radio frequency front-end circuit; and
wherein a parameter of the first output matching network is associated with the first band, and wherein a parameter of the second output matching network is associated with the second band.

3. The multi-band radio frequency front-end device according to claim 2, wherein the first output matching network and the second output matching network each comprise at least one of a transformer, an inductor, or a balun.

4. The multi-band radio frequency front-end device according to claim 3, wherein the first output matching network comprises a first primary coil and a first secondary coil, wherein the second output matching network comprises a second primary coil and a second secondary coil, wherein the first primary coil is embedded in the second primary coil, and wherein the first secondary coil is embedded in the second secondary coil.

5. The multi-band radio frequency front-end device according to claim 4, wherein a quantity of coil turns of each of the first primary coil, the second primary coil, the first secondary coil, and the second secondary coil is 1, wherein the first primary coil and the second primary coil are embedded at a same first layer, and wherein the first secondary coil and the second secondary coil are embedded at a layer other than the first layer.

6. The multi-band radio frequency front-end device according to claim 4, wherein a quantity of coil turns of each of the first primary coil and the second primary coil is n, and n is an integer greater than 1, wherein the first primary coil and the second primary coil are disposed at at least two layers, and at any layer of the at least two layers, the first primary coil is embedded in the second primary coil.

7. The multi-band radio frequency front-end device according to claim 4, wherein a quantity of coil turns of each of the first secondary coil and the second secondary coil is n, and n is an integer greater than 1, wherein the first secondary coil and the second secondary coil are disposed at at least two layers, and at any layer of the at least two layers, the first secondary coil is embedded in the second secondary coil.

8. The multi-band radio frequency front-end device according to claim 2, wherein the first output matching network and the second output matching network are disposed in one of a differential output arrangement or a single-ended output arrangement.

9. The multi-band radio frequency front-end device according to claim 1, wherein the first matching network comprises a first input matching network coupled to an input end of the first radio frequency front-end circuit;
wherein the second matching network comprises a second input matching network coupled to an input end of the second radio frequency front-end circuit; and
wherein a parameter of the first input matching network is associated with the first band, and wherein a parameter of the second input matching network is associated with the second band.

10. The multi-band radio frequency front-end device according to claim 9, wherein the first input matching network and the second input matching network each comprise at least one of a transformer, an inductor, or a balun.

11. The multi-band radio frequency front-end device according to claim 1, wherein the first radio frequency front-end circuit and the second radio frequency front-end circuit each comprise at least one of a power amplifier, a low noise amplifier, a variable gain amplifier, a filter, a phase shifter, or a frequency mixer.

12. The multi-band radio frequency front-end device according to claim 1, wherein the first radio frequency front-end circuit and the second radio frequency front-end circuit each have an independent active bias circuit.

13. The multi-band radio frequency front-end device according to claim 1, wherein the first band covers a band n260, and wherein the second band covers at least one band in n257, n258, or n261.

14. A multi-band receiver comprising:
a first receive channel circuit, configured to process a signal on a band n260; and
a second receive channel circuit, configured to process a signal on at least one band in n257, n258, or n261;
wherein the first receive channel circuit comprises a first matching network, and wherein the first matching network supports the band n260;
wherein the second receive channel circuit comprises a second matching network, and wherein the second matching network supports a band in n257, n258, and n261; and
wherein routing of the first matching network and routing of the second matching network on a layout are annular and nested.

15. The multi-band receiver according to claim 14, wherein the first receive channel circuit comprises at least a first low noise amplifier, wherein a first input matching network of the first low noise amplifier is the first matching network, wherein the second receive channel circuit comprises at least a second low noise amplifier, and wherein a second input matching network of the second low noise amplifier is the second matching network.

16. A multi-band transmitter, comprising:
a first transmit channel circuit, configured to process a signal on a band n260; and
a second transmit channel circuit, configured to process a signal on at least one band in n257, n258, or n261;
wherein the first transmit channel circuit comprises a first matching network, and the first matching network supports the band n260;
wherein the second transmit channel circuit comprises a second matching network, and the second matching network supports a band in n257, n258, and n261; and
wherein routing of the first matching network and routing of the second matching network on a layout are annular and nested.

17. The multi-band transmitter according to claim 16, wherein the first transmit channel circuit and the second transmit channel each comprise at least one of a power amplifier, a low noise amplifier, a variable gain amplifier, a filter, a phase shifter, or a frequency mixer.

18. The multi-band transmitter according to claim 16, wherein the first transmit channel circuit comprises at least a first power amplifier, wherein a first output matching network of the first power amplifier is the first matching network, wherein the second transmit channel circuit comprises at least a second power amplifier, and wherein a second output matching network of the second power amplifier is the second matching network.

* * * * *